July 9, 1963     F. J. WINCHELL ETAL     3,096,613
TRANSMISSION
Original Filed July 25, 1956     2 Sheets-Sheet 1
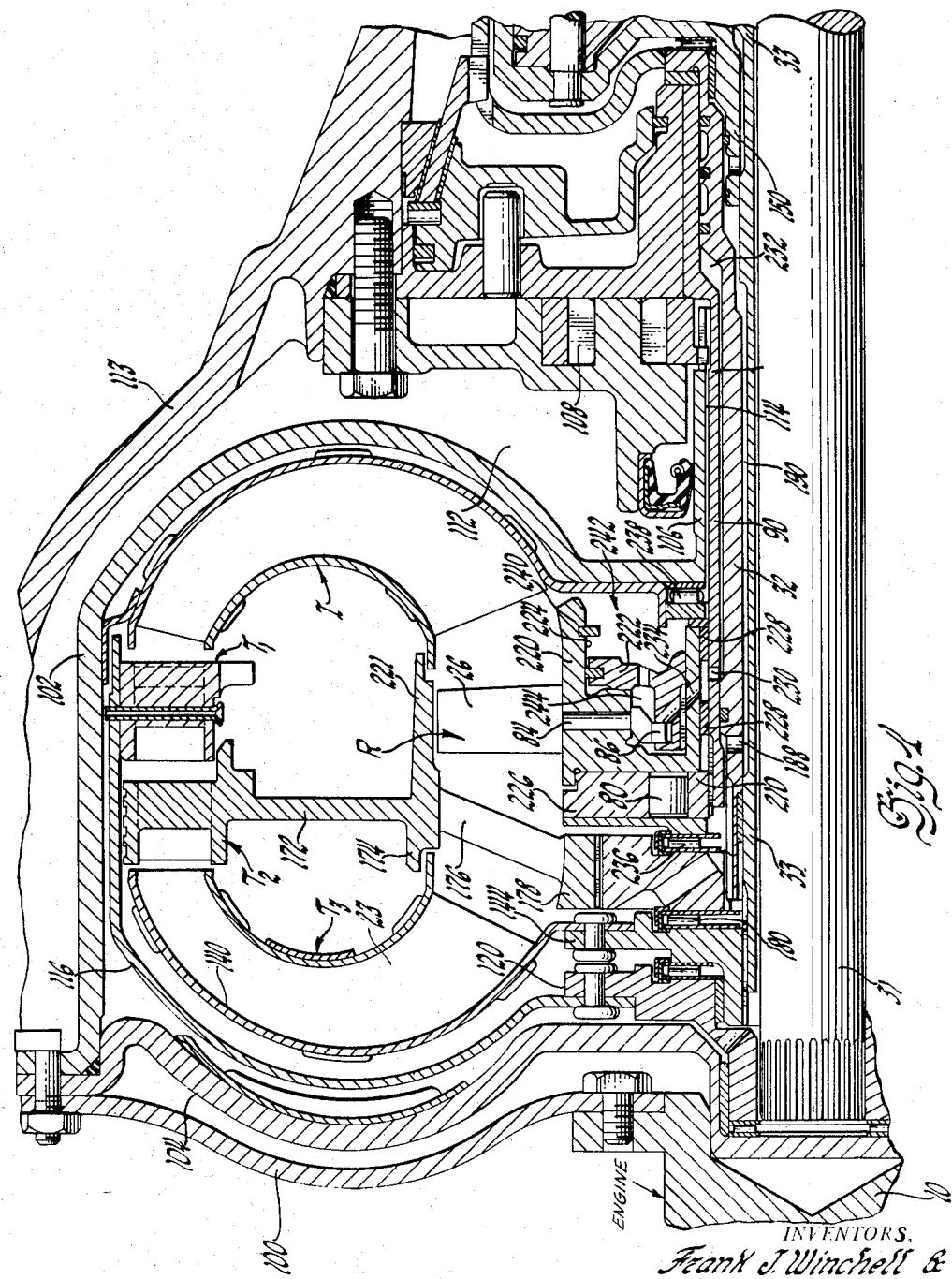
INVENTORS.
Frank J. Winchell &
BY Oliver K. Kelley
*T. L. C. Chisholm*
ATTORNEY.

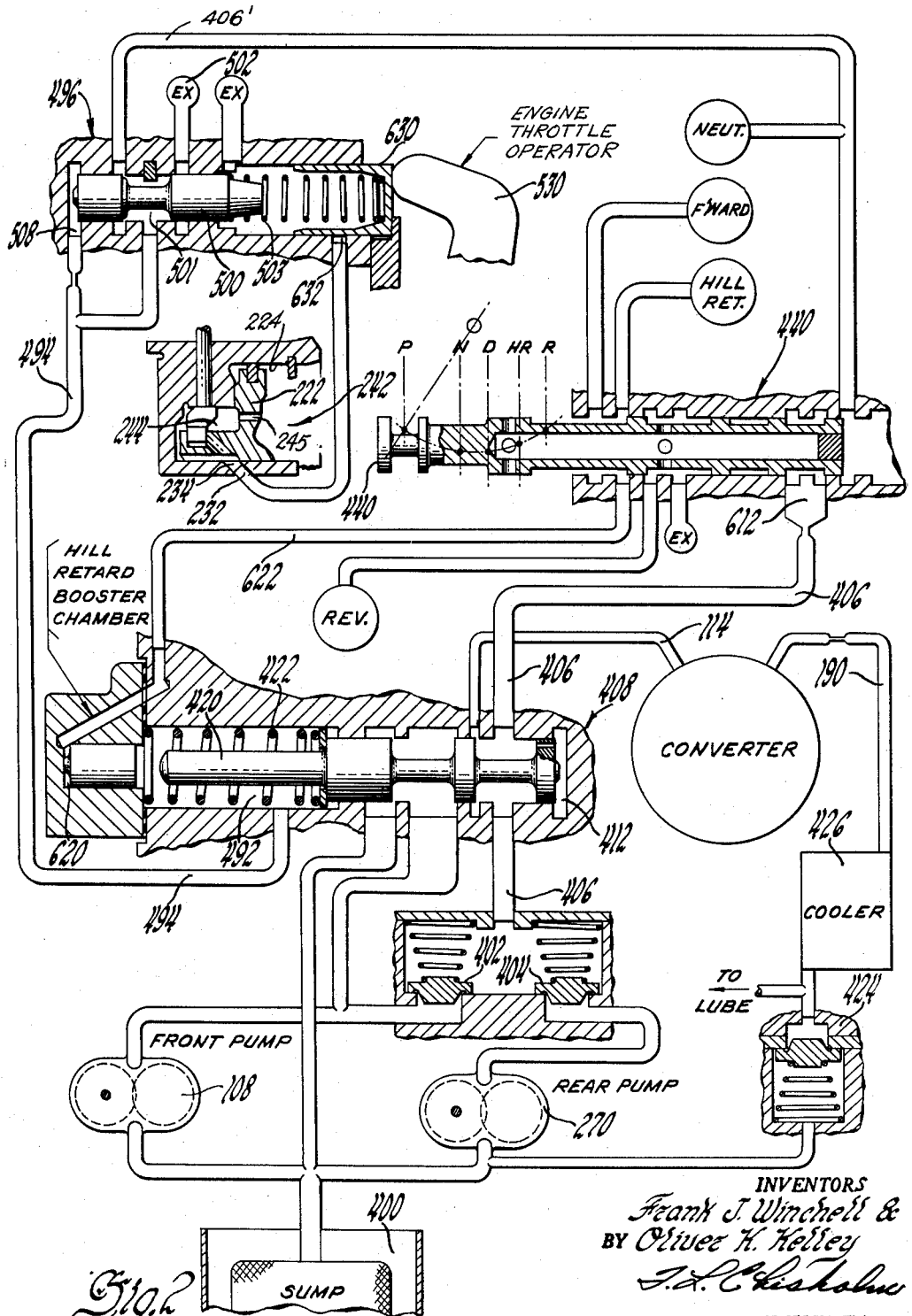

United States Patent Office 3,096,613
Patented July 9, 1963

3,096,613
TRANSMISSION
Frank J. Winchell and Oliver K. Kelley, Bloomfield Hills, Mich., assignors to General Motors Corporation, Detroit, Mich., a corporation of Delaware
Original application July 25, 1956, Ser. No. 600,022. Divided and this application Mar. 1, 1961, Ser. No. 92,599
2 Claims. (Cl. 60—12)

This is a division of my application, Serial Number 600,022, filed July 25, 1956, now Patent No. 3,019,668.

This invention relates to improvements in the construction, arrangement, and control system in transmissions embodying hydrodynamic torque converters which may drive gearing for driving a power output shaft at various speed ratios. The transmission may be used for driving a motor vehicle.

Hydrodynamic torque converters can be readily designed to provide any practical degree of torque multiplication on starting, but if the starting torque ratio is sufficiently high, the torque delivered by the turbine or output member may decrease too rapidly to be practical as the turbine starts to turn, and vanishes at an impractically low turbine speed. This provides poor acceleration of the vehicle and may provide too little torque as the device approaches coupling or one-to-one speed ratio. On the other hand, the turbine can be constructed to provide acceptable coupling characteristics when the load reaches approximately impeller speed, but this is done at a sacrifice of starting or stall torque and at the sacrifice of accelerating torque in the middle ranges of car speed.

These considerations have resulted in the design and construction of torque converters having various arrangements of several turbines of different torque characteristics with or without torque-multiplying gearing. While these have been satisfactory within their inherent limitations, they have had the disadvantage that they do not sustain adequate torque multiplication during intermediate speed ranges of the vehicle, which makes sluggish cars and makes it impractical, without changing gears, to obtain the so-called passing gear by which is meant a sudden increase of torque ratio at any car speed throughout a wide range of car speeds.

This invention seeks to overcome these and other disadvantages of known hydrodynamic transmsisions and to provide improved and simplified means for increasing the torque ratio at any car speed.

More specifically this invention provides means for increasing the range of torque ratio of one or more of the turbines at any car speed to provide acceleration in emergencies or for a passing gear, by changing the angle of reaction blades.

The invention also includes an improved control system for changing the angles of the reaction blades.

The foregoing and other objects and advantages of the invention will be apparent from the annexed description and from the accompanying drawings, in which:

FIG. 1 is one-half of a symmetrical, longitudinal section of the actual structure of a portion of a transmission embodying one form of the invention; and FIG. 2 is a schematic control diagram of one form of control system for the transmission shown in FIG. 1.

Referring first to FIG. 1, the output shaft 10 of any suitable engine is bolted to a flywheel 100 which is bolted to a torque converter casing including an impeller shell 102 and a front cover 104. An impeller I is attached to the impeller shell 102. In the center of its rear end, the impeller 102 is welded to or formed integral with a tubular shaft 106 which drives any suitable oil pump 108 herein called the front pump enclosed by part of the transmission casing 113. The shaft 106 is spaced from a stationary reaction sleeve 90 to form a passage 114 by which oil may be supplied to the torque converter from the system as is known.

A first turbine T1 includes an outer supporting shell 116, riveted at its center to a flange 120 which may be keyed to the front end of a first output shaft 31 which drives any suitable part of any suitable transmission driven by the torque converter.

Another turbine T3 has an outer shell 140 riveted to a flange 144 keyed to a tubular output shaft 33 which forms part of the drive of the transmission.

Another turbine T2 includes a shroud 172 supported by a spider 176 on an inner hub 178 keyed to the front end of a third output shaft 32. The front end of the shaft 32 may have openings 188 which with the space inside the hub 178, form a passage from the interior of the torque converter to the annular space 190 between the hollow shafts 32 and 33, which forms an outlet for oil from the torque converter, as will be explained.

A reaction member, guide wheel, or stator R is placed between the outlet of turbine T3 and the inlet of impeller I and includes adjustable blades or vanes 26, each fixed to a spindle 84 journaled in a reaction support 220. The stator blades 26 are disposed between the support 220 and a skirt 221 forming an inner shroud or part of the inner boundary of the working space. The skirt 221 may be integral with the T2 hub 174. Each spindle 84 has a crank arm 86 disposed in an annular groove in a piston 222 sliding in an annular cylinder 224 formed in the reaction support 220. The reaction support is rigidly secured to the outer race 226 of any suitable freewheeler which includes sprags or rollers 80 running on an inner race 210 keyed to the ground sleeve 90 which is fixed to the frame 113. The reaction support 220 is supported for rotation by bearing sleeves 228 on the ground sleeve 90. Between the bearing sleeves, one or more holes 230 are drilled in the ground sleeve 90 to establish communication between a control conduit 232 (formed by the annular space between the shaft 32 and the ground sleeve 90) and a vent port 234 in the wall of the cylinder 224. The stator as a whole may be supported axially between a thrust bearing 236 in a counterbore in the T2 hub 178 and a similar thrust bearing 238 between the end of the inner wall of the cylinder of the support 220 and the shell 102 of the impeller. The piston 222 may be retained in the cylinder by a snap ring 240. As seen best in FIG. 2, the piston 222 divides the cylinder 224 into a pair of pressure chambers 242 and 244 connected by a restricted, or slow-flow passage 245.

The hydraulic force of oil circulating through the stator tends to hold the blades 26 as nearly as possible parallel to the direction of oil flowing past them. This is because the blades have a larger area on the downstream side of the pivots than on the upstream side. This position is referred to as low angle, or low performance position and is the position in which the blades redirect the oil through the lowest angle from turbine T3 to impeller I, and thus provides the lowest range of torque multiplication.

When there is no pressure in the low angle holding chamber 244 the pressure of oil in the converter acting in high angle holding chamber 242 (the converter being kept filled with oil under pressure as is customary) holds the piston to the left in the position shown and holds the blades 26 at high angle, in which they redirect the oil from T3 to impeller I through the greatest angle to provide the greatest range of torque multiplication. The pressure maintained in the converter and the area of the piston are selected so that the force of oil on the right-hand side of the piston in the chamber 242 is sufficient to overcome the hydraulic force tending to move the blades to low angle when the chamber 244 is vented. If the chamber 244 is filled, this balances the force of static pressures on the piston, allowing the hydraulic force of circulating oil on the blades 26 to hold them at low angle. When it is desired to place the blades at high angle, the passage 232 is vented by the control apparatus, as will be explained, to vent low angle holding chamber 244 so that the force of pressure in chamber 242 moves the blades to high angle.

As indicated schematically in FIG. 2, any suitable form of oil pump, represented by 270 in FIG. 2, is keyed to the final drive shaft of the transmission for providing oil under pressure in response to forward motion of the car as is customary.

Control System

The structure described can be operated by any suitable controls which place the stator blades in the desired positions either manually or automatically. One example of controls embodying the invention is shown diagrammatically in FIG. 2.

In general, this control system includes any suitable source of control fluid under pressure, a manually operable selector valve for selecting forward, neutral, and reverse; and an automatic valve for regulating the pressure of the control system in accordance with torque demand on the engine, and a manual valve for placing the stator in high angle after the throttle has been fully opened.

The source of pressure includes front pump 108 of FIG. 1 driven by the engine and a rear pump 270 of FIG. 2 driven by the output shaft of the vehicle with which the transmission is used. The pumps take in oil from a sump 400 and deliver it at high pressure through the check valves 402 and 404, respectively, to a main line 406. The pressure in the main line is regulated by any suitable pressure regulator valve generally designated by 408 having a pressure-regulating chamber 412 at one end of a valve stem generally designated 420 constantly urged to the right, as FIG. 2 is seen, by a spring 422. The arrangement is such that either pump supplies oil to the converter at a predetermined pressure through the conduit 114, previously referred to, and which, as shown in FIG. 1, includes the space between the stator ground sleeve 90 and the sleeve 106 on the impeller shell 102. Oil is led from the converter by the passage 190 which, as shown in FIG. 1, includes the space between the third turbine shaft 33 and the second turbine shaft 32. The discharge passage 190 from the converter leads eventually to the sump and pressure within the converter is controlled by a pressure-responsive discharge valve 424 in the conduit 190.

The continuous supply of oil from the regulator valve through converter feed line 114 and the continuous discharge of oil from the converter through the pressure release valve 424 maintains the converter filled or charged with oil under any desired pressure, for example 30 pounds per square inch, as is known.

The main line 406 supplies oil at regulated pressure in the known manner to a manual valve 440 which selectively directs oil under pressure for operating means auxiliary to the turbines, such as forward and reverse pressure chambers for establishing various speed ratios in any desired transmission connected to the output of the torque converter, as is known.

The line pressure can be regulated in accordance with torque demand on the engine by a modulating control chamber 492 at the left-end of the regulator valve which assists spring 422 by being connected through conduit 494 to a presure-modulating valve, generally designated by 496, which maintains in the line 494 a pressure measured by the torque demand on the engine. The result is that when the torque demand is high, the pressure in the main line 110 is high, while when torque demand is low, line pressure is reduced.

The modulator valve 496 itself may be of any suitable known construction, but it is used in combination with novel features to be described. For example, a valve stem 500 either admits oil under main line pressure from line 406′ (connected to main line 406 whenever the manual valve is in drive position) to a modulated pressure chamber 501 and modulating line 494 or vents chamber 501 through an exhaust port 502. The valve stem is urged toward open position to increase the pressure in line 494 by a spring 503 and is urged toward closed and vented position to reduce pressure in the line 494 by the force of the modulated pressure conducted from chamber 501 to a modulating chamber 508.

Control of Torque Multiplication

The torque multiplication effected by the torque converter is controlled by positioning the blades 26 of the reaction element, as shown in FIG. 1, and as described above in connection with this figure. The blades are urged to a high angle against the hydraulic force of the blades by pressure of oil in the high angle holding chamber 242 whenever the low angle holding chamber 244 is vented. The apparatus is designed so that the converter pressure which always exists in chamber 242 can always overcome the hydraulic force on the blades. Consequently whenever the chamber 244 is vented this pressure in chamber 242 holds the blades at high angle.

It is desirable to have the blades 26 normally in low angle and to place them in high angle only in times of very high torque demand which can be indicated by any suitable torque demand indicator, such as a wide-open engine throttle. Therefore, the chamber 244 is normally filled with oil at converter pressure thru the passage 245 which slowly and continuously supplies oil to the low angle holding chamber 244 from the high angle holding chamber 242. This is the source of supply to the chamber 244.

When it is desired to hold the stator blades in low angle, the conduit 232 is merely closed so that oil accumulates in the pressure chamber 244 to balance the static pressures on opposite sides of the piston 222 and allow the hydraulic force on the blades to hold them in low angle. When it is desired to hold the blades in high angle the conduit 232 is merely vented so that oil flows from the chamber 244 through the vent port 234 faster than oil can flow into the chamber 244 through the restricted orifice 245. This unbalances the static pressures on opposite sides of the piston 222 so that the converter pressure in chamber 242 pushes the piston to the left as the drawing is seen and positions the blades at high angle.

The valve stem 500 is urged to the right to reduce the pressure in line 494 by the pressure of the modulated line itself in the modulating chamber 508 and the valve stem is urged to the left as FIG. 2 is seen to increase the pressure by a spring 503 the tension of which is determined by any suitable torque demand indicating device, herein exemplified by arm 530 connected to the throttle of the engine so as to compress the spring progressively as the throttle is opened. This is one well-known device for maintaining in the line 494 a pressure which is a measure of the torque demand on the engine.

The arm 530 acts on the spring 503 through a spring abutment 630 which also serves as a stator control valve. The vent passage 232 of the low position stator holding cylinder 244 is connected to a port 632 which is closed by the valve 630 in all positions of the throttle from idling to some predetermined opening, such as fully open. Whenever it is desired to vent the cylinder 244 to place the stator blade in high angle the throttle pedal is floored and its movement beyond full open throttle position pushes the piston valve 630 to the left past the vent port 632 to connect this port to the open end of the body of the valve 496 and thus vent the stator control cylinder 244.

We claim:

1. A power transmission comprising in combination a hydrodynamic device for transmitting torque to turbine means from an impeller for being driven by an engine having a movable torque demand indicating device, a movable adjusting element for influencing the torque between the impeller and turbine means, means for urging the adjusting element toward a first position providing a high torque transmitting range between the impeller and turbine means, a fluid pressure chamber for overcoming the urging means and holding the adjusting element in a second position providing a low torque transmitting range, means normally supplying fluid under pressure to said fluid pressure chamber to hold the adjusting element in the second position, a source of fluid under pressure for operating means auxiliary to the turbine means, a regulator valve for increasing the pressure of the source as torque demand on the engine increases, the regulator valve including a spring for increasing the pressure of the source when the spring is stressed, a spring abutment movable in response to movement of the torque demand indicating device for stressing the spring, a vent port opened by the abutment in its movement and a connection from said fluid pressure chamber to the vent port for venting the pressure chamber to move the adjusting element to the first position after predetermined movement of the torque demand indicating device.

2. A power transmission comprising in combination a hydrodynamic device for transmitting torque to turbine means from an impeller for being driven by an engine controlled by a throttle, a movable adjusting element for influencing the torque between the impeller and turbine means, means for urging the adjusting element toward a first position providing a high torque transmitting range between the impeller and turbine means, a fluid pressure chamber for overcoming the urging means and holding the adjusting element in a second position providing a low torque transmitting range, means normally supplying fluid under pressure to said fluid pressure chamber to hold the adjusting element in the second position, a source of fluid under pressure for operating means auxiliary to the turbine means, a regulator valve for increasing the pressure of the source as torque demand on the engine increases, the regulator valve including a spring adapted when stressed to increase the pressure, a regulator valve adjusting means connected to the throttle of the engine for movement from closed throttle position through open throttle position and beyond, a spring abutment for stressing the spring moved in response to movement of the adjusting means throughout its range of movement, a vent port opened by the abutment in its movement beyond open throttle position, and a connection from said fluid pressure chamber to the vent port for venting the chamber and moving the adjusting element to the first position when the throttle is fully open.

References Cited in the file of this patent

FOREIGN PATENTS

| 444,171 | Great Britain | Mar. 16, 1936 |
| 750,788 | Great Britain | June 20, 1956 |